(12) United States Patent
Little et al.

(10) Patent No.: US 6,370,952 B1
(45) Date of Patent: Apr. 16, 2002

(54) VEHICLE OIL LEVEL MONITORING SYSTEM

(76) Inventors: Aaron Little; Ronald Robinson, both of 16110 Alden Ridge, Houston, TX (US) 77053

(*) Notice: Subject to any disclaimer, the term of this patent is extended or adjusted under 35 U.S.C. 154(b) by 0 days.

(21) Appl. No.: 09/583,930

(22) Filed: May 31, 2000

Related U.S. Application Data

(60) Provisional application No. 60/136,864, filed on Jun. 1, 1999.

(51) Int. Cl.[7] .............................................. G01F 23/36
(52) U.S. Cl. ...................... 73/313; 73/301; 73/304 R; 73/306
(58) Field of Search ........................ 73/290 B, 304 R, 73/313, 301, 306

(56) References Cited

U.S. PATENT DOCUMENTS

| | | | |
|---|---|---|---|
| 3,728,704 A | | 4/1973 | Moore |
| 4,034,608 A | * | 7/1977 | Vincent ........................ 73/313 |
| 4,091,671 A | * | 5/1978 | McLees ........................ 73/313 |
| 4,186,604 A | * | 2/1980 | Mattila ........................ 73/295 |
| 4,640,126 A | * | 2/1987 | Jansch ........................ 73/290 R |
| 4,845,469 A | | 7/1989 | Benda |
| 4,912,646 A | | 3/1990 | Cerruti |
| 5,019,800 A | | 5/1991 | Gallert |
| 5,210,769 A | | 5/1993 | Seidel et al. |
| D352,010 S | | 11/1994 | Curbbun |

* cited by examiner

*Primary Examiner*—Hezron Williams
*Assistant Examiner*—Katina Wilson

(57) ABSTRACT

A vehicle oil level monitoring system for verifying the amount of oil in an engine without requiring the user to access the engine compartment. The vehicle oil level monitoring system includes a vehicle with an engine and a fuel port, a dipstick, a sensor coupled to the dipstick for sensing the level of oil in the engine, and a monitoring assembly.

13 Claims, 4 Drawing Sheets

VEHICLE OIL LEVEL MONITORING SYSTEM

CROSS REFERENCE TO RELATED APPLICATION

This application claims the benefit of U.S. Provisional Application No. 60/136,864, filed Jun. 1, 1999.

BACKGROUND OF THE INVENTION

1. Field of the Invention

The present invention relates to fluid level sensors and more particularly pertains to a new vehicle oil level monitoring system for verifying the amount of oil in an engine without requiring the user to access the engine compartment.

2. Description of the Prior Art

The use of fluid level sensors is known in the prior art. More specifically, fluid level sensors heretofore devised and utilized are known to consist basically of familiar, expected and obvious structural configurations, notwithstanding the myriad of designs encompassed by the crowded prior art which have been developed for the fulfillment of countless-objectives and requirements. Known prior art includes U.S. Pat. Nos. 4,845,469; 5,019,800; 5,210,769; 3,728,704; 4,912,646; and U.S. Pat. No. Des. 352,010.

While these devices fulfill their respective, particular objectives and requirements, the aforementioned patents do not disclose a new vehicle oil level monitoring system. The inventive device includes a vehicle with an engine and a fuel port, a dipstick, a sensor coupled to the dipstick for sensing the level of oil in the engine, and a monitoring assembly.

In these respects, the vehicle oil level monitoring system according to the present invention substantially departs from the conventional concepts and designs of the prior art, and in so doing provides an apparatus primarily developed for the purpose of verifying the amount of oil in an engine without requiring the user to access the engine compartment.

SUMMARY OF THE INVENTION

In view of the foregoing disadvantages inherent in the known types of fluid level sensors now present in the prior art, the present invention provides a new vehicle oil level monitoring system construction wherein the same can-be utilized for verifying the amount of oil in an engine without requiring the user to access the engine compartment.

The general purpose of the present invention, which will be described subsequently in greater detail, is to provide a new vehicle oil level monitoring system apparatus and method which has many of the advantages of the fluid level sensors mentioned heretofore and many novel features that result in a new vehicle oil level monitoring system which is not anticipated, rendered obvious, suggested, or even implied by any of the prior art fluid level sensors, either alone or in any combination thereof.

To attain this, the present invention generally comprises a vehicle with an engine and a fuel port, a dipstick, a sensor coupled to the dipstick for sensing the level of oil in the engine, and a monitoring assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a-cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle oil level monitoring system apparatus and method which has many of the advantages of the fluid level sensors mentioned heretofore and many novel features that result in a new vehicle oil level monitoring system which is not anticipated, rendered obvious, suggested, or even implied by any of the prior art fluid level sensors, either alone or in any combination thereof.

It is another object of the present invention to provide a new vehicle oil level monitoring system which may be easily and efficiently manufactured and marketed.

It is a further object of the present invention to provide a new vehicle oil level monitoring system which is of a durable and reliable construction.

An even further object of the present invention is to provide a new vehicle oil level monitoring system which is susceptible of a low cost of manufacture with regard to both materials and labor, and which accordingly is then susceptible of low prices of sale to the consuming public, thereby making such vehicle oil level monitoring system economically available to the buying public.

Still yet another object of the present invention is to provide a new vehicle oil level monitoring system which provides in the apparatuses and methods of the prior art some of the advantages thereof, while simultaneously overcoming some of the disadvantages normally associated therewith.

Still another object of the present invention is to provide a new vehicle oil level monitoring system for verifying the amount of oil in an engine without requiring the user to access the engine compartment.

Yet another object of the present invention is to provide a new vehicle oil level monitoring system which includes a vehicle with an engine and a fuel port, a dipstick, a sensor coupled to the dipstick for sensing the level of oil in the engine, and a monitoring assembly.

Still yet another object of the present invention is to provide a new vehicle oil level monitoring system that provides a quantified indication of the amount of oil required if any.

Even still another object of the present invention is to provide a new vehicle oil level monitoring system that allows the user to verify oil level without the mess commonly associated with accessing the engine compartment of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
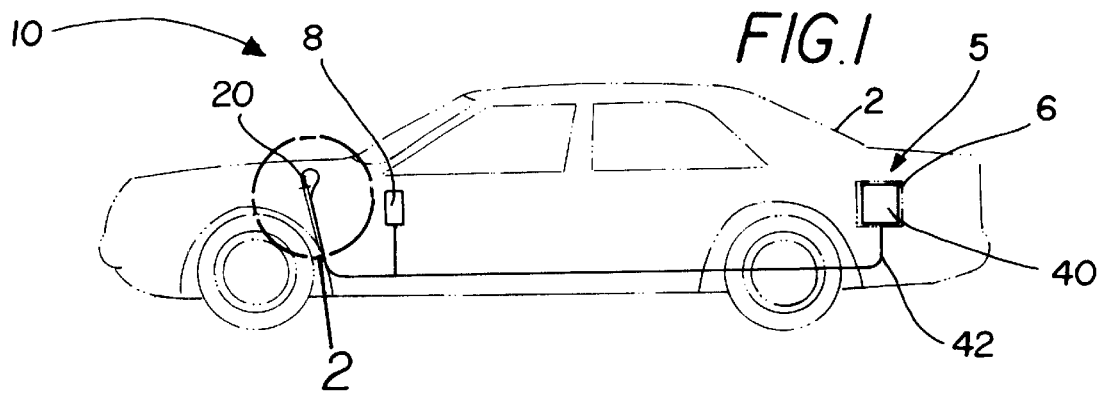
FIG. 1 is a schematic view of a new vehicle oil level monitoring system according to the present invention.
Figure 2:
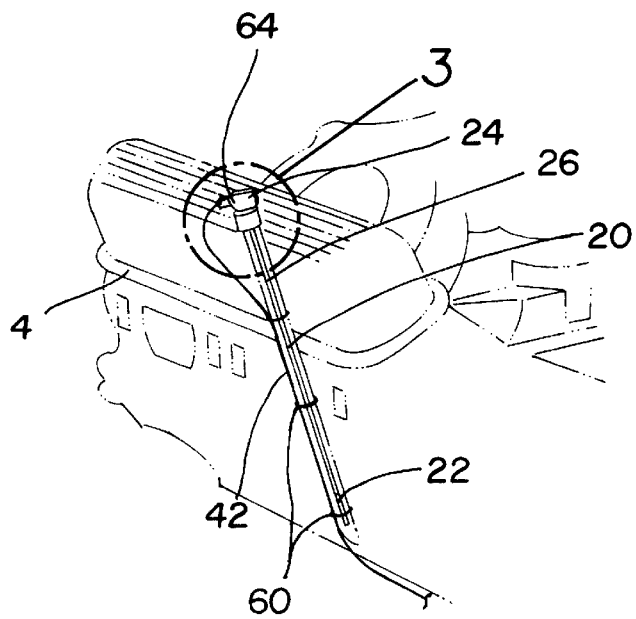
FIG. 2 is a schematic detail view of the dipstick of the present invention.
Figure 3:
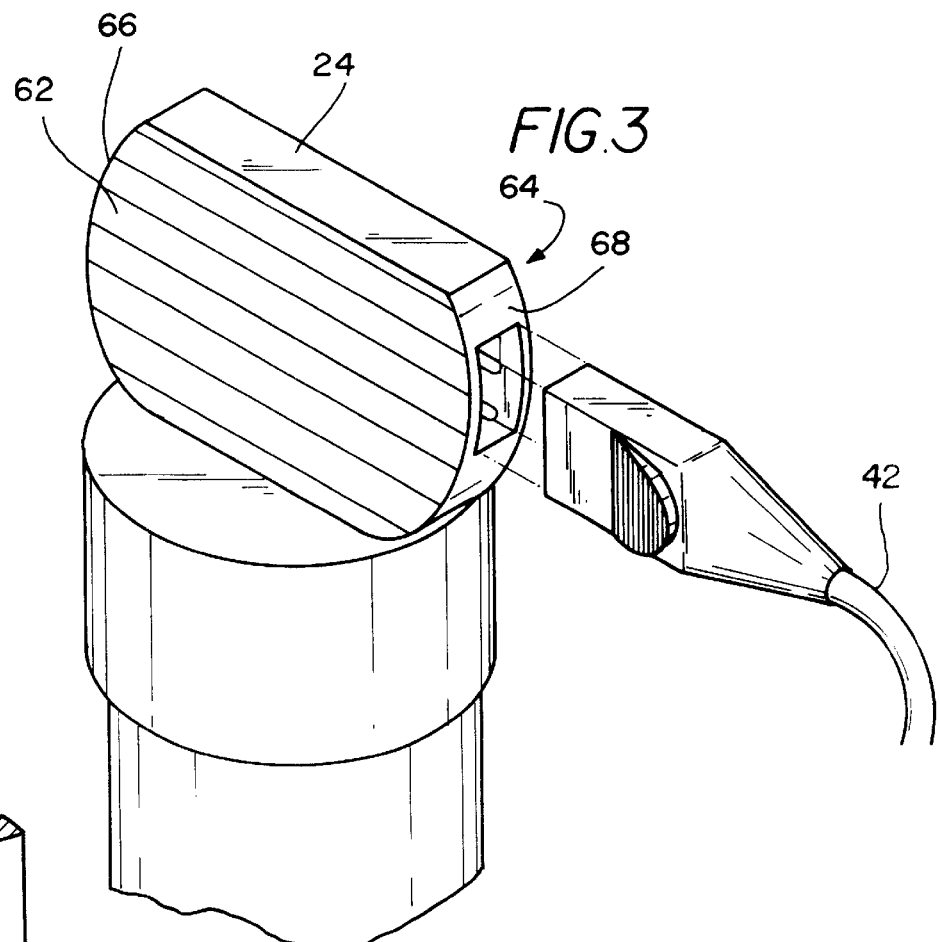
FIG. 3 is a schematic detail view of the connection port and electronic connector of the present invention.
Figure 4:
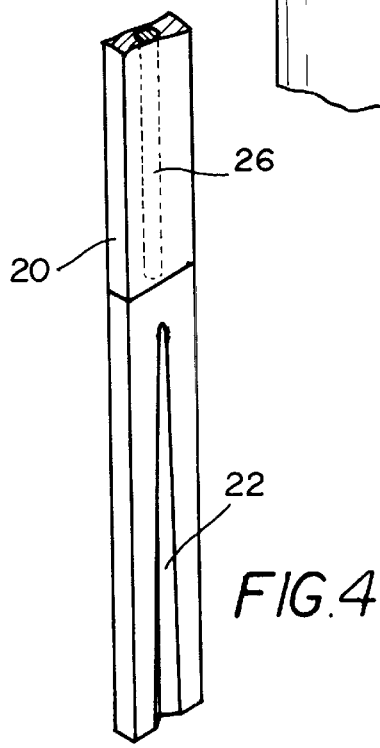
FIG. 4 is a schematic detail view of the dipstick and sensor of the present invention.
Figure 5:
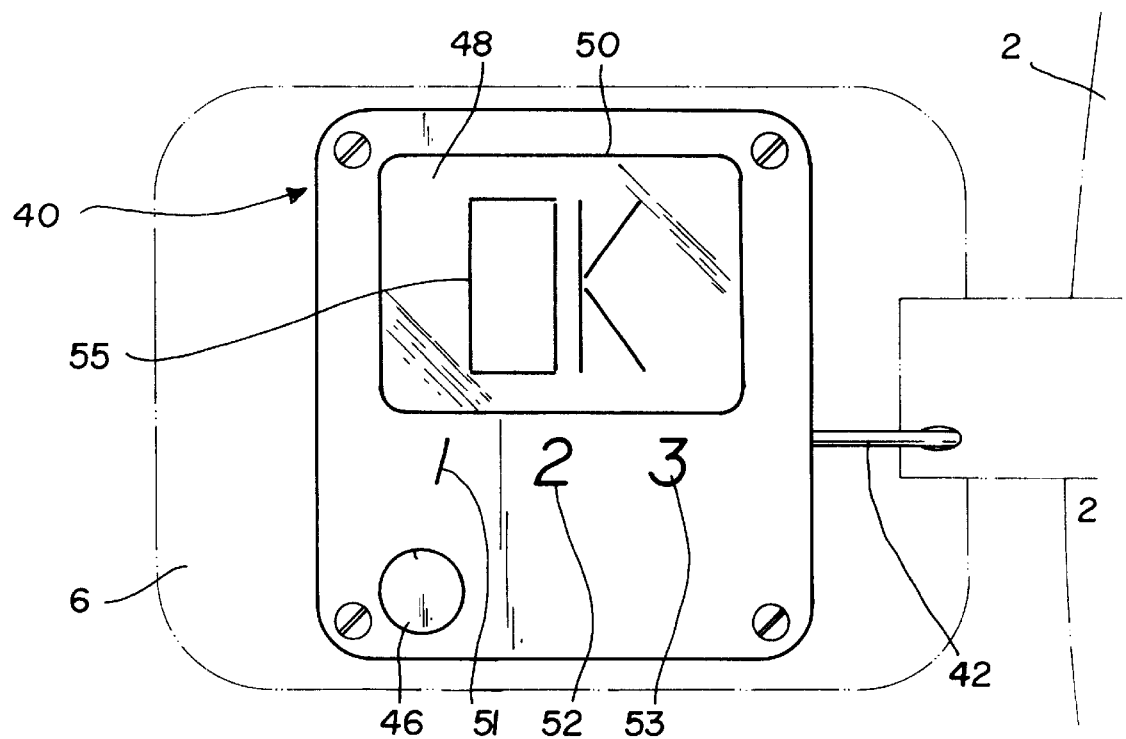
FIG. 5 is a schematic front view of the monitoring assembly of the present invention.
Figure 6:
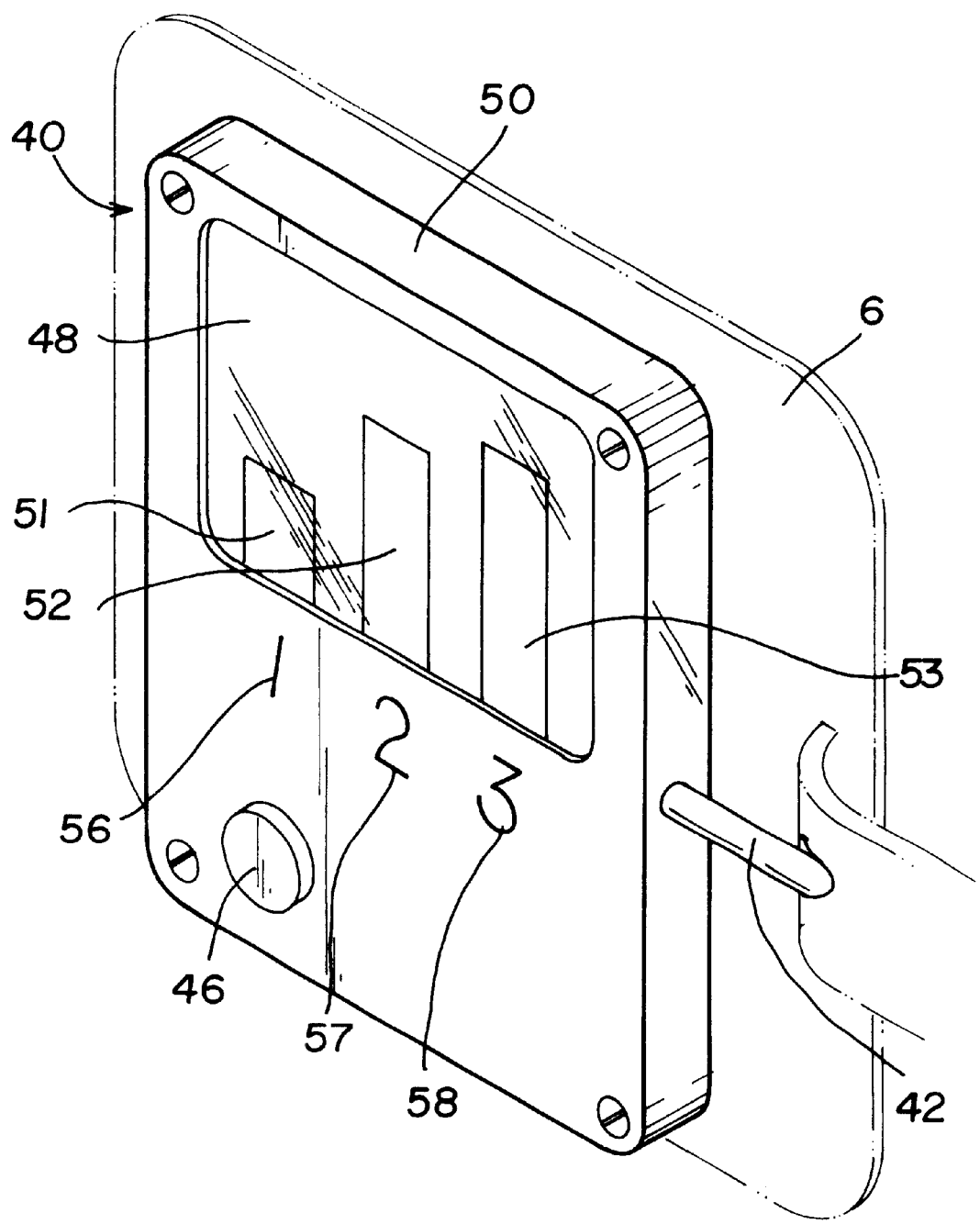
FIG. 6 is a schematic perspective view of the monitoring assembly of the present invention.

With reference now to the drawings, and in particular to FIGS. 1 through 6 thereof, a new vehicle oil level monitoring system embodying the principles and concepts of the present invention and generally designated by the reference numeral 10 will be described.

As best illustrated in FIGS. 1 through 6. The vehicle oil level monitoring system 10 generally comprises a vehicle 2 including an engine 4 and a fuel port 5, a dipstick 20 for inserting into the engine 4 of the vehicle 2, a sensor 22 coupled to the dipstick 20 for sensing a level of oil in the engine 4, and a monitoring assembly 40.

The monitoring assembly 40 is operationally coupled to the sensor 22 for indicating the level of oil in the engine 4 sensed by the sensor 22. The monitoring assembly 40 is positioned proximate the fuel port of the vehicle 2 for facilitating monitoring of the level of oil in the engine 4 sensed by the sensor 22 when filling the vehicle 2 with fuel.

The vehicle 2 includes a fuse box 8. The fuse box 8 is electronically coupled between the sensor 22 and the monitoring assembly 40.

The sensor 22 is coupled to a distal end of the dipstick 20. An electronic connection port 24 is coupled to a proximal end of the dipstick 20. A wire 26 is embedded in the dipstick 20. The wire 26 extends between the electronic connection port 24 and the sensor 22 for electrically connecting the sensor 22 to the electrical connection port 24.

A connection wire 42 is operationally coupled to the monitoring assembly 40. The connection wire 42 includes an electronic connector 44 which is selectively couplable to the electrical connection port 24. Thus the dipstick 20 is selectively couplable to the monitoring assembly 40 for facilitating removal of the dipstick 20 from the engine 4.

A plurality of attachment members 60 are used for coupling the connection wire 42 to the vehicle 2.

The vehicle 2 includes a fuel port door 6 for selectively covering the fuel port 5. The monitoring assembly 40 is coupled to an interior face of the fuel port door 6 for permitting access to the monitoring assembly 40 when the fuel port door 6 is in an open position.

The electrical connection port 24 includes a pair of substantially planar faces 62 and 64 and a pair of arcuate ends 66 and 68 which extend between the planar faces such that the electrical connection port 24 is designed for facilitating grasping of the electrical connection port 24 by fingers of a user to facilitate removal of the dipstick 20 from the engine 4.

The monitoring assembly 40 includes an activation button 46. The activation button 46 is for selectively activating the monitoring assembly 40. Thus the monitoring assembly 40 indicates a level of oil sensed by the sensor 22 upon depression of the activation button 46.

The monitoring assembly 40 includes a display screen 48. The display screen 48 is for displaying indicia indicating the level of oil sensed by the sensor 22 upon depression of the activation button 46.

The monitoring assembly 40 displays a first indicia 55 for indicating the level of oil sensed by the sensor 22 exceeds a pre-determined value. Thus the monitoring assembly 40 is designed for indicating to a user that no additional oil needs to be added to the engine 4.

The monitoring assembly 40 displays a one unit needed indicia 51 on the display screen 48 upon the sensor 22 sensing a level of oil over one liquid measuring unit less than a pre-determined value. Thus the monitoring assembly 40 is designed for indicating to the user that one unit of oil needs to be added to the engine 4.

The monitoring assembly 40 displays a two units needed indicia 52 on the display screen 48 upon the sensor 22 sensing a level of oil over two liquid measuring units less than a pre-determined value. Thus the monitoring assembly 40 is designed for indicating to the user that three units of oil need to be added to the engine 4.

The monitoring assembly 40 displays a three units needed indicia 53 on the display screen 48 upon the sensor 22 sensing a level of oil over three liquid measuring units less than a pre-determined value. Thus the monitoring assembly 40 is designed for indicating to the user that three units of oil need to be added to the engine 4.

The monitoring assembly 40 includes a first housing indicia 56 on a housing 50 of the monitoring assembly 40, a second housing indicia 57 on the housing 50, and a third housing indicia 58 on the housing 50. The first housing indicia 56 is positioned adjacent to the display screen 48. The one unit needed indicia 51 is displayed adjacent to the first housing indicia 56 for facilitating reading of the one unit needed indicia 51. The second housing indicia 57 is positioned adjacent to the display screen 48. The two units needed indicia 52 is displayed adjacent to the second housing indicia 57 for facilitating reading of the two units needed indicia. The third housing indicia 58 is positioned adjacent to the display screen 48. The three units needed indicia 53 is displayed adjacent to the third housing indicia 58 for facilitating reading of the three units needed indicia.

In use, the opens the fuel port door and depresses the activation button on the monitoring assembly. The monitoring assembly then displays to appropriate indicia as corresponds to the information sent by the sensor to the monitoring assembly via the connection wire.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional-relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention;

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle oil level monitoring system comprising:
   a vehicle having an engine and a fuel port;
   a dipstick for inserting into the engine of the vehicle;
   a sensor coupled to said dipstick for sensing a level of oil in said engine;
   a monitoring assembly operationally coupled to said sensor for indicating said level of oil in said engine sensed by said sensor, said monitoring assembly being positioned proximate said fuel port of said vehicle for facilitating monitoring of said level of oil in said engine sensed by said sensor when filling said vehicle with fuel;
   said sensor being coupled to a distal end of said dipstick;
   an electronic connection port coupled to a proximal end of said dipstick;
   a wire embedded in said dipstick, said wire extending between said electronic connection port and said sensor for electrically connecting said sensor to said electrical connection port; and
   said electrical connection port having a pair of substantially planar faces and a pair of arcuate ends extending between said planar faces such that said electrical connection port is adapted for facilitating grasping of said electrical connection port by fingers of a user to facilitate removal of said dipstick from said engine.

2. The vehicle oil level monitoring system of claim 1, further comprising:
   said monitoring assembly including a display screen, said display screen being for displaying a level of oil sensed by said sensor.

3. The vehicle oil level monitoring system of claim 2, further comprising:
   said monitoring assembly displaying a first indicia for indicating said level of oil sensed by said sensor exceeds a pre-determined value whereby a user is informed no additional oil needs to be added to said engine.

4. The vehicle oil level monitoring system of claim 2, further comprising:
   said monitoring assembly displaying a one unit needed indicia upon said sensor sensing a level of oil over one liquid measuring unit less than a pre-determined value whereby said monitoring assembly is adapted for indicating to a user that one unit of oil needs to be added to said engine.

5. The vehicle oil level monitoring system of claim 2, further comprising:
   said monitoring assembly displaying a two units needed indicia upon said sensor sensing a level of oil over two liquid measuring units less than a pre-determined value whereby said monitoring assembly is adapted for indicating to a user that two units of oil need to be added to said engine.

6. The vehicle oil level monitoring system of claim 2, further comprising:
   said monitoring assembly displaying a three units needed indicia upon said sensor sensing a level of oil over three liquid measuring units less than a pre-determined value whereby said monitoring assembly is adapted for indicating to a user that three units of oil need to be added to said engine.

7. The vehicle oil level monitoring system of claim 1, further comprising:
   said monitoring assembly including an activation button, said activation button being for selectively activating said monitoring assembly whereby said monitoring assembly indicates a level of oil sensed by said sensor upon depression of said activation button.

8. The vehicle oil level monitoring system of claim 1, further comprising:
   said vehicle including a fuse box, said fuse box being electronically coupled between said sensor and said monitoring assembly.

9. The vehicle oil level monitoring system of claim 1, further comprising:
   a connection wire operationally coupled to said monitoring assembly, said connection wire having an electronic connector selectively couplable to said electrical connection port whereby said dipstick is selectively couplable to said monitoring assembly for facilitating removal of said dipstick from said engine.

10. The vehicle oil level monitoring system of claim 1, further comprising:
    said vehicle having a fuel port door for selectively covering said fuel port; and
    said monitoring assembly being coupled to an interior face of said fuel port door for permitting access to said monitoring assembly when said fuel port door is in an open position.

11. The vehicle oil level monitoring system of claim 1, further comprising:

said monitoring assembly including an activation button, said activation button being for selectively activating said monitoring assembly whereby said monitoring assembly indicates a level of oil sensed by said sensor upon depression of said activation button;

said monitoring assembly including a display screen, said display screen being for displaying indicia indicating said level of oil sensed by said sensor upon depression of said activation button.

12. A vehicle oil level monitoring system comprising:

a vehicle having an engine and a fuel port;

a dipstick for inserting into the engine of the vehicle;

a sensor coupled to said dipstick for sensing a level of oil in said engine;

a monitoring assembly operationally coupled to said sensor for indicating said level of oil in said engine sensed by said sensor, said monitoring assembly being positioned proximate said fuel port of said vehicle for facilitating monitoring of said level of oil in said engine sensed by said sensor when filling said vehicle with fuel;

said monitoring assembly including an activation button, said activation button being for selectively activating said monitoring assembly whereby said monitoring assembly indicates a level of oil sensed by said sensor upon depression of said activation button;

said monitoring assembly including a display screen, said display screen being for displaying indicia indicating said level of oil sensed by said sensor upon depression of said activation button;

said monitoring assembly displaying a first indicia for indicating said level of oil sensed by said sensor exceeds a pre-determined value whereby said monitoring assembly is adapted for indicating to a user that no additional oil needs to be added to said engine;

said monitoring assembly displaying a one unit needed indicia on said display screen upon said sensor sensing a level of oil over one liquid measuring unit less than a pre-determined value whereby said monitoring assembly is adapted for indicating to the user that one unit of oil needs to be added to said engine;

said monitoring assembly displaying a two units needed indicia on said display screen upon said sensor sensing a level of oil over two liquid measuring units less than a pre-determined value whereby said monitoring assembly is adapted for indicating to the user that three units of oil need to be added to said engine;

said monitoring assembly displaying a three units needed indicia on said display screen upon said sensor sensing a level of oil over three liquid measuring units less than a pre-determined value whereby said monitoring assembly is adapted for indicating to the user that three units of oil need to be added to said engine;

said monitoring assembly including a first housing indicia on a housing of said monitoring assembly, a second housing indicia on said housing, and a third housing indicia on said housing;

said first housing indicia being positioned adjacent to said display screen, said one unit needed indicia being displayed adjacent to said first housing indicia for facilitating reading of said one unit needed indicia;

said second housing indicia being positioned adjacent to said display screen, said two units needed indicia being displayed adjacent to said second housing indicia for facilitating reading of said two units needed indicia; and said third housing indicia being positioned adjacent to said display screen, said three units needed indicia being displayed adjacent to said third housing indicia for facilitating reading of said three units needed indicia.

13. A vehicle oil level monitoring system comprising:

a vehicle having an engine and a fuel port;

a dipstick for inserting into the engine of the vehicle;

a sensor coupled to said dipstick for sensing a level of oil in said engine;

a monitoring assembly: operationally coupled to said sensor for indicating said level of oil in said engine sensed by said sensor, said monitoring assembly being positioned proximate said fuel port of said vehicle for facilitating monitoring of said level of oil in said engine sensed by said sensor when filling said vehicle with fuel;

said vehicle including a fuse box, said fuse box being electronically coupled between said sensor and said monitoring assembly;

said sensor being coupled to a distal end of said dipstick;

an electronic connection port coupled to a proximal end of said dipstick;

a wire embedded in said dipstick, said wire extending between said electronic connection port and said sensor for electrically connecting said sensor to said electrical connection port;

a connection wire operationally coupled to said monitoring assembly, said connection wire having an electronic connector selectively couplable to said electrical connection port whereby said dipstick is selectively couplable to said monitoring assembly for facilitating removal of said dipstick from said engine;

a plurality of attachment members for coupling said connection wire to said vehicle;

said vehicle having a fuel port door for selectively covering said fuel port;

said monitoring assembly being coupled to an interior face of said fuel port door for permitting access to said monitoring assembly when said fuel port door is in an open position;

said electrical connection port having a pair of substantially planar faces and a pair of arcuate ends extending between said planar faces such that said electrical connection port is adapted for facilitating grasping of said electrical connection port by fingers of a user to facilitate removal of said dipstick from said engine;

said monitoring assembly including an activation button, said activation button being for selectively activating said monitoring assembly whereby said monitoring assembly indicates a level of oil sensed by said sensor upon depression of said activation button;

said monitoring assembly including a display screen, said display screen being for displaying indicia indicating said level of oil sensed by said sensor upon depression of said activation button;

said monitoring assembly displaying a first indicia for indicating said level of oil sensed by said sensor exceeds a pre-determined value whereby said monitoring assembly is adapted for indicating to a user that no additional oil needs to be added to said engine;

said monitoring assembly displaying a one unit needed indicia on said display screen upon said sensor sensing a level of oil over one liquid measuring unit less than a pre-determined value whereby said monitoring assembly is adapted for indicating to the user that one unit of oil needs to be added to said engine;

said monitoring assembly displaying a two units needed indicia on said display screen upon said sensor sensing a level of oil over two liquid measuring units less than a pre-determined value whereby said monitoring assembly is adapted for indicating to the user that three units of oil need to be added to said engine;

said monitoring assembly displaying a three units needed indicia on said display screen upon said sensor sensing a level of oil over three liquid measuring units less than a pre-determined value whereby said monitoring assembly is adapted for indicating to the user that three units of oil-need to be added to-said engine;

said monitoring assembly including a first housing indicia on a housing of said monitoring assembly, a second housing indicia on said housing, and a third housing indicia on said housing;

said first housing indicia being positioned adjacent to said display screen, said one unit needed indicia being displayed adjacent to said first housing indicia for facilitating reading of said one unit needed indicia;

said second housing indicia being positioned adjacent to said display screen, said two units needed indicia being displayed adjacent to said second housing indicia for facilitating reading of said two units needed indicia; and said third housing indicia being positioned adjacent to said display screen, said three units needed indicia being displayed adjacent to said third housing indicia for facilitating reading of said three units needed indicia.

* * * * *